3,287,206
SIZE CONTAINING ROSIN, TERPENE RESIN AND REACTION PRODUCT OF AN ACIDIC COMPOUND WITH A TERPENE RESIN AND USE OF THE SIZE FOR SIZING PAPER
Paul H. Aldrich, Greenville, Del., and Herman I. Enos, Jr., Fairville Hills, Pa., assignors to Hercules Incorporated, a corporation of Delaware
No Drawing. Filed Nov. 16, 1964, Ser. No. 411,558
12 Claims. (Cl. 162—168)

This application is a continuation-in-part of application Serial No. 182,094, filed March 23, 1962, now abandoned.

This invention relates to novel sizing compositions and to the use of same for sizing paper, paperboard and like cellulosic materials.

One of the most widely used sizing agents for paper, paperboard and the like is manufactured from rosin and sold as a paste or dry rosin size. Paste rosin sizes are prepared by partially saponifying rosin with aqueous alkali to form aqueous dispersions in the form of relatively thick pastes. These pastes, which usually contain from about 70% to about 80% solids, but may contain from about 50% to about 80% or more solids, are readily converted to dilute emulsions in known manner. Dry sizes are generally prepared by dehydration (usually by some form of spray or drum drying) of paste sizes which are made by complete or nearly complete neutralization of the rosin acids. Such sizes may be dispersed by mixing in water or by simply adding the dry powder to pulp in a beater.

At high solids contents, e.g., around 80% and above, paste rosin sizes are very viscous and difficult to handle unless heated to relatively high temperatures. Moreover, some paste rosin sizes are very difficult to convert to clear emulsions which have the requisite stability for use in commercial operations.

A principal object of this invention is the provision of paste sizes having lower viscosities than the usual paste rosin sizes of commerce.

Another object of the invention is the provision of paste sizes of the indicated type having improved emulsifiability.

Still another object of the present invention is the provision of rosin size compositions containing materials which serve to replace a portion of the rosin usually present in such compositions and which compositions have sizing efficiencies equivalent to ordinary paste and/or dry rosin sizes.

A further object of the invention is the provision of novel paste and/or dry rosin sizes containing relatively low-cost materials which serve as extenders for rosin in such sizes.

A still further object of the invention is the provision of methods of preparing the above-indicated sizes.

It has now been found that the above and other objects can be attained by the provision of sizing compositions containing rosin, a terpene hydrocarbon resin and a reaction product of an acidic compound containing the

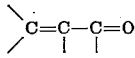

group with a terpene hydrocarbon resin. The improved sizes of the invention can thus be described as mixtures containing rosin, a terpene hydrocarbon resin, and a reaction product of an acidic compound containing the

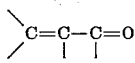

group with a terpene hydrocarbon resin, such mixtures, if in the form of pastes, being partially neutralized and, if in the form of dry sizes, being substantially completely neutralized.

In the preparation of paste sizes in accordance with the invention, a mixture of rosin, terpene resin and reaction product of an acidic compound containing the

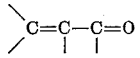

group with a terpene resin is warmed to about 100 to about 150° C., preferably to about 120 to about 140° C., and aqueous alkali, e.g., aqueous sodium or potassium hydroxide or carbonate, is added. During this addition, the temperature gradually reduces and heat is applied, as required, until the reaction is substantially complete. Sufficient water can be added in the aqueous alkali to provide the total solids in the paste or, alternatively, water can be added or removed during or after the reaction to obtain the desired solids content in the size. The amount of alkali used will depend upon the degree of saponification or neutralization desired. Generally, a partial neutralization of the rosin acids to the extent of from about 70% to about 95% is desirable for paste sizes. However, if the paste is to be converted to a dry size, substantially complete neutralization is preferred.

The term "rosin" as used herein is intended to embrace any of the usual types of rosin such as wood rosin, gum rosin and tall oil rosin in crude or refined state and/or after treatments of various kinds to increase its effectiveness for the intended purpose. It also includes modified rosins such as partially or substantially completely hydrogenated rosins and polymerized rosins, as well as rosins which have been heat treated, reacted with formaldehyde, or otherwise treated to inhibit crystallization of the rosin or sizes prepared therefrom.

Rosins containing or which have been admixed with various fortifying agents can also be used. Rosin compositions of this type are desirably prepared by reacting rosin with from about one-twentieth mole to about one mole, per mole of rosin, of an acidic compound containing the

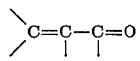

group including α,β-unsaturated monobasic and polybasic organic acids and acid anhydrides such as acrylic, maleic, fumaric, itaconic and citraconic acids and their anhydrides. Products of this type and methods of preparing and using same are well known as shown, for example, in U.S. 2,628,918 and U.S. 2,684,300. The fortifying agent may be reacted with the rosin before or after adding the terpene polymer. Rosin compositions containing other types of fortifying agents such as the reaction product of a polymer of an acylic terpene containing three double bonds per molecule with an acidic compound containing the

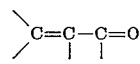

group including α,β-unsaturated monobasic and polybasic organic acids and acid anhydrides can also be used. Compositions of this type are described in copending application Serial No. 182,136, filed March 23, 1962.

The rosins and rosin compositions described above may also include varying amounts of fatty acids or fatty acid mixtures. For example, there can be used a tall oil rosin obtained by the fractional distillation of tall oil and containing up to a few percent of a tall oil fatty acid mixture.

The terpene resins contemplated for use in accordance with the present invention are polymerization products of terpene hydrocarbons including the dimers as well as higher polymers obtained by polymerization and/or copolymerization of terpene hydrocarbons such as the alicyclic, monocyclic and bicyclic terpenes and their mixtures including allo-ocimene, carene, isomerized pinene, pinene, dipentene, terpinene, terpinolene, turpentine, a terpene cut or fraction, and various other terpenes. A description of these terpene hydrocarbons is given on pages 710, 711 and 720 to 731, inclusive, of volume 13 of the Encyclopedia of Chemical Technology. Terpene resins suitable for use herein are described on pages 700 to 704, inclusive, of volume 13 of the Encyclopedia of Chemical Technology. A particularly useful and economic starting material is the "sulfate turpentine" obtained as a by-product in the sulfate pulping process. Typical "sulfate turpentine" compositions are shown in the following table.

paste sizes where viscosity increase is not objectionable or where viscosity is otherwise controllable, the higher molecular weight polymers, e.g., above 500 (Rast), can be used in amounts designed to impart the desired characteristics to the size. The preferred range of terpene resin for incorporation in paste sizes is from about 1.0% to about 35% by weight, based on the weight of rosin. In the case of dry sizes, from about 1% to about 25% by weight, based on the weight of rosin, of terpene resin is preferred.

In the preparation of the reaction product of an acidic compound containing the

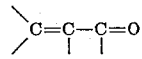

*Table 1.—Typical composition of turpentines in weight percent*

| Component | Gum Turpentine ||||| 
|---|---|---|---|---|---|
| | Southern [1] | Western [3] | Indian [2] || Honduras [2] |
| | | | P. excelsa | P. longifolia | |
| α-Pinene | 60–65 | 3 | 89 | 23 | 68 |
| Camphene | | | 4 | | 3 |
| β-Pinene | 25–35 | | 30 | 3 | 4 | 5 |
| 3-carene | | 47 | | 65 | |
| Limonene | | | 1 | | |
| β-Phellandrene | | | | | 13 |
| Terpinolene | | 3 | | | |
| Others | 5–8 | 17 | 3 | 8 | 11 |

| Component | Wood Turpentine ||| Sulfate Turpentine ||||
|---|---|---|---|---|---|---|---|
| | Southern [1] | Western [3] | Mexican [2] | Southern [2] | Western [2] | Northern [2] | Scandinavian [2] |
| α-Pinene | 75–80 | 8 | 70 | 60 | 34 | 72 | 48 |
| Camphene | 4–8 | | 6 | 2 | 2 | 2 | |
| β-Pinene | 0–2 | 6 | 2 | 20 | 9 | 16 | 6 |
| 3-carene | | 70 | 5 | 2 | 33 | 6 | 41 |
| Limonene | | | 7 | | 7 | | |
| β-Phellandrene | | | 2 | | | | |
| Terpinolene | | | 4 | | 3 | | |
| Others | 15–20 | 16 | 4 | 15 | 12 | 4 | 5 |

[1] Encyclopedia of Chemical Technology, Vol. 14, The Interscience Encyclopedia, Inc., N.Y., 1955.
[2] Data determined by Hercules Powder Company.
[3] N. T. Mirov. Journal of FPRS, Feb., 1954, pp. 1–7.

The polymerization of the terpene hydrocarbon or mixture of terpene hydrocarbons can be carried out in known manner with or without solvent and utilizing a known catalyst such as sulfuric acid, phosphoric acid, fuller's earth, boron trifluoride, amphoteric metal chlorides such as zinc chloride or aluminum chloride, and so on. The polymerization is preferably carried out under conditions which cause substantially all of the monoterpenes to react.

The amount of terpene resin in the sizing compositions of the present invention can vary from about 0.5% to about 45% by weight, based on the weight of rosin, the particular amount being influenced by a number of factors, e.g., the characteristics of the terpene resin including its molecular weight, the results desired, and so on. For example, for maximum reduction in viscosity of paste sizes, lower molecular weight terpene resins, e.g., from about 272 to about 330 (Rast), are preferred. However, when these materials are incorporated in unfortified sizes in amounts greater than about 10%, or in fortified sizes in amounts greater than about 33%, both based on rosin, there is some loss in sizing. On the other hand, terpenes resins with a somewhat higher molecular weight, e.g., from about 400 to about 500 (Rast), can be incorporated in amounts up to about 45% by weight, based on the weight of rosin, without loss of sizing efficiency though with less effectiveness in reduction of viscosity. In the case of dry sizes, or in group with a terpene resin, the reactants are intimately mixed and heated to a temperature sufficient to effect the reaction. This will vary somewhat depending upon the character of the reactants used and other conditions of reaction; but, in general, temperatures from about 150° C. to about 250° C. will usually be found satisfactory. Preferred temperatures are from about 190° C. to about 210° C.

Peroxide catalysts can be used to promote reaction with less reactive resins or if it is desired to lower the reaction temperature. The reactants are desirably included in equimolar proportions. However, other proportions can be used according to the reactivity of the particular resin used.

In a typical reaction utilizing maleic anhydride, the resin is warmed to 100–150° C., the desired amount of maleic anhydride added, and the mixture stirred and warmed as required to obtain the desired reaction temperature. When the reaction temperature exceeds 180° C., a reflux condenser with coolant at about 53° C. (M.P. maleic anhydride) is useful, though not essential, to prevent loss of maleic anhydride. Where desired, peroxide catalyst can be added when the maleic anhydride is added or later. Suitable peroxide catalysts include benzoyl peroxide, dicumyl peroxide, di-tert-butyl peroxide, cumene hydroperoxide. These may be added in amounts up to 15% of the weight of the reaction mixture though economic considerations might limit the use to about 5%. All of the peroxide may be added at once, or a little may be added at a time until all has been added. Because of the cost of maleic anhydride, relative to the resin, it is preferable to adjust conditions so that all the anhydride reacts.

After the reaction is complete, unreacted materials may be removed in any suitable manner as by solvent-solvent extraction using any of the various known polar-nonpolar solvent combinations known to the art of solvent-solvent extraction of organic materials. Aliphatic and/or alicyclic hydrocarbons including hexane, heptane, octane, cyclohexane, methylcyclohexane, and gasoline are suitable nonpolar solvents. Suitable polar phases include aqueous methanol and acetonitrile. Conditions are adjusted so that the maleic anhydride adduct will be found in the polar phase and the unreacted polymer in the nonpolar phase. The adduct may be recovered by distilling the polar solvent or by precipitation with a large volume of water. When unreacted maleic anhydride is present, it can be removed by vacuum topping, either before or after separation of the unreacted polymer.

Any of the terpene resins known to the art including those previously described herein can be utilized for preparation of the above-described reaction products. Particularly preferred are the sulfate turpentine resins hereinabove described.

The acidic compounds containing the

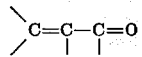

group suitable for use herein are the α,β-unsaturated carboxylic acids, i.e., the polybasic acids such as maleic, fumaric, citraconic, itaconic and aconitic acids and the monobasic acids such as acrylic, methacrylic, α-crotonic and β-crotonic acids. Derivatives of the acids such as the anhydrides, acrylonitrile, etc., can also be used. The anhydrides are particularly useful.

The invention also contemplates the formation of the reaction product of the terpene resin and the acidic compound containing the

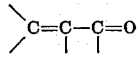

group in situ. In such case, the terpene resin is reacted with an amount of the acidic compound containing the

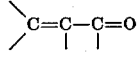

group sufficient to provide the desired amount of reaction product. Where it is desired to react the terpene resin substantially completely with the acidic compound, it is preferred to use from about 10% to about 27% by weight, based on the weight of terpene resin, of the acidic compound. Where partial reaction only is desired so as to leave varying amounts of unreacted terpene resin in the product in admixture with the reaction product, the amount of acidic compound is desirably from about 0.5 to about 10% by weight, based on the weight of terpene resin. The invention thus contemplates reacting the terpene resin with from about 0.5% to about 27% by weight, based on the weight of terpene resin, of the acidic compound containing the

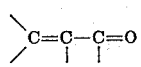

group.

The in situ reaction of the terpene resin and the acidic compound containing the

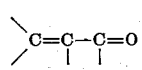

group will be carried out at a suitably elevated temperature which will fall generally within the range from about 150° C. to about 200° C., the preferred range being from about 190° C. to about 210° C. The reaction period may vary between about ¼ hour and 10 hours, preferably between about 1 hour and 5 hours, depending upon the temperature. Various inert solvents may, if desired, be employed. Thus, for example, tetrahydronaphthalene, decahydronaphthalene, Hi-flash naphtha and the chlorinated diphenyls may be employed. An inert atmosphere such as $CO_2$ or $N_2$ may also be used. Peroxide catalysts may be used to give a faster or more complete reaction or to lower the reaction temperature.

In the preparation of the sizing compositions of the invention, the reaction product of the acidic compound containing the

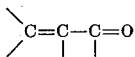

group with the terpene resin, if separately formed as described above, is intimately admixed with the rosin and terpene resin as by melting. If formed in situ, no further mixing is required unless it is desired to incorporate further amounts of reaction product or terpene resin. The amount of reaction product to be admixed with the rosin and terpene resin will depend upon a number of factors including the nature of the resin, the nature of the reaction product, the amount of terpene resin present, and so on. In general, however, amounts from about 0.5% to about 50% by weight, based on the weight of terpene resin, will be satisfactory. This can be made up entirely of separately formed reaction product or in situ formed reaction product or partly of separately formed reaction product and partly of in situ formed reaction product in any desired proportions.

The mixture of rosin, terpene resin and reaction product of an acidic compound containing the

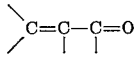

group with a terpene resin is converted to a paste size of a desired solids content by partial saponification with aqueous alkali, i.e., alkali metal hydroxide or carbonate, in the manner hereinbefore described. These partially neutralized paste sizes are readily converted to primary emulsions containing from about 6% to about 20% solids by adding water at 25–100° C. These can be mixed with cold water to form stable, dilute, secondary emulsions containing from about 1% to about 5% solids which can be used for sizing in the manner hereinafter described.

In the manufacture of dry sizes in accordance with the invention, the mixture of rosin, terpene resin and reaction product of an acidic compound containing the

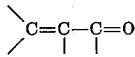

group with a terpene resin is reacted with sufficient aqueous alkali to substantially completely neutralize the mixture. The resulting pastes are then dehydrated as by spray drying to form the dry sizes.

In the sizing of paper the size is added to an aqueous pulp suspension, the dry size being added as such or in an aqueous dispersion, and the paste size being added in the form of a dilute, aqueous emulsion. The size is added in an amount sufficient to supply from about 0.25% to about 5% by weight, based on the weight of dry pulp, of solids. The particular amount used will depend, of course, upon a number of factors such as the particular sizing composition, the nature of the pulp, the degree of sizing desired, and so on. This however, is readily determinable by one skilled in the art. After thoroughly beating the mixture, aluminum sulfate or like fixing agent is added in suitable amounts, e.g., from about 1% to about 5% by weight, based on the dry weight of pulp, and the pulp then sheeted and dried in the usual manner.

The following specific examples will further illustrate the invention.

*Examples 1–6*

A refined western sulfate turpentine (200 g.) was added dropwise to an agitated mixture of 450 g. dry toluene and 18.0 g. aluminum chloride. The temperature during the addition was held at 4–10° C. by cooling. The time of addition was 55 minutes. The reaction was continued at 8–10° C. for 4 hours after the addition of turpentine was complete. Water (22° C.) was added with agitation while keeping the temperature below 20° C. Fifteen minutes after the addition of water was complete, 45 g. calcium hydroxide was added and the mixture warmed and held at 70° C. for 20 minutes. The hot mixture was filtered, and the filter cake was washed with toluene, and the washings were combined with the product filtrate. When the filtrate cooled, additional solid formed which was separated by an additional filtration. The resulting filtrate was stripped using an oil bath for heat. Stripping was stopped at 120 mm. pressure with the oil bath at 200° C. The residue was a soft solid with molecular weight (Rast method) 430.

This product was modified by adding 3.85 g. maleic anhydride to 150 g. turpentine resin at 150° C. The mixture was stirred and heated at 200° C. under reflux (condenser water at 53° C.). The temperature was held at 200–210° C. for 2½ hours. The mixture was cooled to 150° C. and poured into a bottle to finish cooling to room temperature. The acid number of this polymer was determined by refluxing a 1 to 2 g. sample (accurately weighed) in 50 ml. wet pyridine (5 ml. water added to one pound pyridine) for 10 minutes and then titrating the sample to a phenolphthalein end point with ¼ N alcoholic potassium hydroxide. The resultant value was 14.6 acid number units. Percent neutrals was 89.9% and percent free maleic anhydride was 0.09%.

Sizes were made by adding aqueous sodium hydroxide to hot mixtures containing varying amounts of this maleic anhydride modified terpene polymer in tall oil rosin. Conditions of preparation were adjusted to give sizes with 18–20 acid number and 80% total solids. These sizes were then evaluated in paper using the following procedure:

Bleached sulfite pulp was beaten to a Schopper-Riegler freeness of 750±10 cc. at 4.5% pulp consistency. This pulp was diluted to 2.5% consistency and the pH adjusted to pH 7. The proper amount of size was added as a 3% aqueous emulsion. Sufficient papermakers' alum was then added to lower the pH of the slurry to about 4.3. This stock was then diluted to 0.25% consistency with pH 4.5 water containing 5 p.p.m. aluminum ion as alum. Sheets of paper were made in a Noble and Wood handsheet machine at 0.25% consistency using pH 4.5 water containing 5 p.p.m. aluminum ion as alum for diluting the pulp for the first sheet and recycle water for the remaining sheets. The sheets were pressed and dried and conditioned at 70° C., 50% relative humidity, and (beginning with the fourth sheet in each run) tested for sizing utilizing the Hercules photometer. The composition of the resin furnish, the clearing temperature of the 15% primary emulsions from the sizes, the viscosity of two of the sizes at 60° C. and sizing data are included in Table 2.

*Table 2*

| Example No. | Percent Tall Oil Rosin | Percent Modified Turpentine Resin | Stormer Viscosity 60° C | Clearing Temperature of 15% Primary Emulsion | Photometer Sizing, Sec., Standard Feather Ink | |
|---|---|---|---|---|---|---|
| | | | | | 0.75% Added | 2.25% Added |
| 1 | 100 | 0 | 65 | 75 | 58 | 205 |
| 2 | 95 | 5 | | 69 | 57 | 210 |
| 3 | 90 | 10 | | 58 | 59 | 203 |
| 4 | 85 | 15 | 40 | 45 | 58 | 210 |
| 5 | 80 | 20 | | 38 | 60 | 215 |
| 6 | 70 | 30 | | 28 | 58 | 215 |

EXAMPLES 7–12

A refined western sulfate turpentine (200 g.) was added dropwise to an agitated mixture of 450 g. dry toluene and 18.0 g. aluminum chloride. The temperature during the addition was held at 4–10° C. by cooling. The time of addition was 55 minutes. The reaction was continued at 8–10° C. for 4 hours after the addition of turpentine was complete. Water (22° C.) was added with agitation while keeping the temperature below 20° C. Fifteen minutes after the addition of water was complete, 45 g. calcium hydroxide was added and the mixture warmed and held at 70° C. for 20 minutes. The hot mixture was filtered and the filter cake was washed with toluene, and the washings were combined with the product filtrate. When the filtrate cooled, additional solid formed which was separated by an additional filtration. The resulting filtrate was stripped using an oil bath for heat. Stripping was dropped at 120 mm. pressure with the oil bath at 200° C. The residue was a soft solid with molecular weight (Rast method) 430.

This product was modified by adding 3.85 g. maleic anhydride to 150 g. turpentine resin at 150° C. The mixture was stirred and heated to 200° C. under reflux (condenser water at 53° C.). The temperature was held at 200–210° C. for 2½ hours. The mixture was cooled to 150° C. and poured into a bottle to finish cooling to room temperature. The acid number of this polymer was determined by refluxing a 1 to 2 g. sample (accurately weighed) in 50 ml. wet pyridine (5 ml. water added to one pound pyridine) for 10 minutes and then titrating the sample to a phenolphthalein end point with ¼ N alcoholic potassium hydroxide. The resultant value was 14.6 acid number units. Percent neutrals was 89.9% and percent free maleic anhydride was 0.09%.

Sizes were made by adding aqueous sodium hydroxide to hot mixtures containing varying amounts of this maleic anhydride modified polymer in tall oil rosin modified with sufficient fumaric acid to give about 4% combined fumaric acid in the final blend of modified turpentine resin and modified tall oil rosin. Conditions of preparation were adjusted to give sizes with 76–78% total solids and acid number 18–20. These sizes were evaluated in paper using the following procedure.

Bleached sulfite pulp was beaten to a Schopper-Riegler freeness of 750±10 cc. at 4.5% pulp consistency. This pulp was diluted to 2.5% consistency and the pH adjusted to pH 7. The proper amount of sizes was added as a 3% aqueous emulsion. Sufficient papermakers' alum was then added to lower the pH of the slurry to about 4.3. This stock was then diluted to 0.25% consistency with pH 4.5 water containing 5 p.p.m. aluminum ion as alum. Sheets of paper were made in a Noble and Wood handsheet machine at 0.25% consistency using pH 4.5 water containing 5 p.p.m. aluminum ion as alum for diluting the pulp for the first sheet and recycle water for the remaining sheets. The sheets were pressed and dried and conditioned at 70° C., 50% relative humidity, and (beginning with the fourth sheet in each run) tested for sizing utilizing the Hercules photometer. The composition of the resin furnish, the clearing temperature of the 15% primary emulsions from the sizes, the viscosity of two of the sizes at 60° C., and sizing data are included in Table 3.

as heat source. Stripping was complete when the bath temperature reached 140° C. at a distillation pressure of 0.4 mm. The residue (835 g.) was a viscous liquid with molecular weight (Rast method) 285.

Four hundred thirty-five g. of the above polymer was stripped further to 170° C./20 mm. to yield a more viscous liquid residue (352 g.) with molecular weight 315 (Rast). Two hundred ninety-two and one-half g. of this material was reacted with 7.5 g. maleic anhydride by the

*Table 3*

| Example No. | Percent Modified Tall Oil Rosin | Percent Modified Turpentine Resin | Stormer Viscosity Poises 60° C. | Clearing Temperature of 15% Primary Emulsion | Photometer Sizing, Seconds, Standard Feather Ink | |
|---|---|---|---|---|---|---|
| | | | | | 0.75% Added | 2.25% Added |
| 7 | 100 | 0 | 187 | 88 | 92 | 277 |
| 8 | 95 | 5 | | 76 | | |
| 9 | 90 | 10 | | 65 | 108 | 289 |
| 10 | 85 | 15 | 66 | 53 | 109 | 291 |
| 11 | 80 | 20 | | 42 | 116 | 344 |
| 12 | 70 | 30 | | 28 | 102 | 285 |

EXAMPLES 13–18

A turpentine polymer was prepared following the procedure of Examples 7–12 except that southern sulfate turpentine was used in place of western sulfate turpentine. The product had an average molecular weight (Rast method) of 500 and a drop softening point of 75° C. A maleic anhydride adduct was made as in Examples 7–12 except 814.2 g. polymer was treated with 29.8 g. maleic anhydride and the heating period was 3½ hours. The acid number by the method described in Examples 7–12 was 24.0. Sizes were made as in Examples 7-12 with varying amounts of this modified turpentine resin in tall oil rosin modified with sufficient fumaric acid to give about 4% combined fumaric acid in the final blend of modified turpentine resin and modified tall oil rosin. These sizes were then evaluated in sizing utilizing the same procedure as in Examples 7–12. The data obtained is given in Table 4.

method of Examples 7–12. The acid number of the product (method of Examples 7–12) was 15.2, percent free maleic anhydride 0.13, and percent neutrals 91.6%.

Eleven hundred seventy g. of a polymer prepared as in Examples 13–18 and having a molecular weight (Rast) of 500 was reacted with 30 g. maleic anhydride by the method of Examples 7–12. The acid number of the product was 18.4 (method of Examples 7–12), percent free maleic anhydride 0.20, and percent neutrals 81.2%.

The unmodified and maleic anhydride modified terpene polymers described above were employed in connection with the preparation of the following described paste sizes:

Paste size "A" (15 acid number) was made with 56% tall oil rosin, 4% combined fumaric acid and 40% of a 3:7 blend of the unmodified terpene polymer having a

*Table 4*

| Example No. | Percent Modified Tall Oil Rosin | Percent Modified Turpentine Resin | Clearing Temperature of 15% Primary Emulsion | Photometer Sizing, Seconds, Standard Feather Ink | |
|---|---|---|---|---|---|
| | | | | 0.75% Added | 2.25% Added |
| 13 | 100 | 0 | 88 | 92 | 275 |
| 14 | 95 | 5 | 80 | | |
| 15 | 90 | 10 | 70 | 85 | 270 |
| 16 | 80 | 20 | 45 | 93 | 270 |
| 17 | 70 | 30 | 28 | 90 | 278 |
| 18 | 60 | 40 | 28 | 90 | 315 |

EXAMPLES 19–25

An acid clay (Super Filtrol) was calcined at 400° C. for 3 hours, and 120 g. was mixed and heated to 100° C. with 900 g. of xylene. To this mixture was added dropwise 1200 g. of "refined" southern sulfate turpentine (a sulfate turpentine which has been treated, usually by distillation and an oxidizing solution such as aqueous sodium or calcium hypochloride, to remove sulfur compounds). The rate of addition of sulfate turpentine was adjusted so that the heat of reaction kept the reaction temperature at 130–139° C. without further application of heat. Addition time was about 35 minutes. When the addition was complete and when the reaction temperature started to decrease, external heating was applied as required to maintain the temperature at 137–140° C. for 1.3 hours. The reaction mixture was allowed to cool to 100° C. before filtration to remove the catalyst. The catalyst was washed with xylene and the washing combined with the first filtrate for vacuum stripping. Solvent and unreacted turpentine were removed by stripping under vacuum with an oil bath molecular weight of 315 with the unmodified terpene polymer having a molecular weight of 500. The molecular weight of the blend (calculated) was about 445.

Paste size "B" (15 acid number) was made with 100% tall oil rosin.

Paste size "C" (15 acid number) was made with 88% tall oil rosin and 12% combined fumaric acid.

Paste size "D" (15 acid number) was made with 13.1% of the maleic anhydride modified 315 molecular weight terpene polymer (12% unmodified neutral polymer plus 1.1% maleic anhydride adduct), 34.4% of the maleic anhydride modified 500 molecular weight terpene polymer (28% unmodified neutral polymer plus 6.4% maleic anhydride adduct), 48.5% tall oil rosin and 4% combined (with rosin) fumaric acid.

These four pastes (all 73% total solids) were combined in varying proportions to give sizes with 4% combined fumaric acid and varying amounts of terpene polymers with and without their maleic adducts. Table 5 below summarizes the results.

Table 5.—Resulting comp. of resin blend

| Example No. | Percent Paste A | Percent Paste B | Percent Paste C | Percent Paste D | Percent Rosin | Percent Terpene Polymer | Percent Terpene Polymer Maleic Anhydride Adduct | Clearing Temperature, 17% Primary Emulsion, °C. | Appearance of 3.5% Emulsion |
|---|---|---|---|---|---|---|---|---|---|
| 19 | 100 | 0 | 0 | 0 | 56 | 40 | 0 | (1) | Cloudy.[2] |
| 20 | 50 | 16 | 34 | 0 | 76 | 20 | 0 | (1) | Hazy. |
| 21 | 25 | 41 | 34 | 0 | 86 | 10 | 0 | 65 | Clear. |
| 22 | 0 | 66 | 34 | 0 | 96 | 0 | 0 | 75 | Do. |
| 23 | 0 | 0 | 0 | 100 | 48.5 | 40 | 7.5 | 28 | Clear.[3] |
| 24 | 0 | 16 | 34 | 50 | 72.2 | 20 | 3.8 | 49 | Clear. |
| 25 | 0 | 41 | 34 | 25 | 84.1 | 10 | 1.9 | 68 | Do. |

[1] These primary emulsions would not clear at any temperature between 25° C. and 100° C.
[2] This dilute emulsion was sufficiently unstable that there was some separation during the 24 hours following preparation.
[3] This dilute emulsion changed from clear to slightly hazy during the 24 hours following preparation. The difference between cloudy and hazy, as these terms are herein used, is that a mark on the back side of an 8-ounce bottle (~2.25 in. O. D.) can be seen through a very hazy emulsion but not through a cloudy emulsion.

EXAMPLES 26–29

A turpentine polymer was prepared utilizing the procedure of Examples 7–12 except that southern sulfate turpentine was used in place of western sulfate turpentine. The product had an average molecular weight (Rast method) of 500. This product was topped under vacuum to remove about 20% to about 25% of a lower boiling fraction containing about 71% dimer, about 24% trimer and about 5% tetramer and having an average molecular weight of about 310. A maleic anhydride adduct of this 310 molecular weight material was formed as in Examples 7–12 utilizing 97.5 parts by weight of the material and 2.5 parts by weight of maleic anhydride. The acid number of the adduct utilizing the method described in Examples 7–12 was 16. Sizes were made as in Examples 7–12 utilizing varying amounts of this modified turpentine resin in tall oil rosin modified with sufficient fumaric acid to give about 4% combined fumaric acid in the final blend of modified turpentine resin and modified tall oil rosin. The sizes, prepared to 80% total solids and acid number 24, were evaluated in sizing utilizing the same procedure as in Examples 7–12. The data obtained is given in Table 6.

Table 6

| Example No. | Percent Modified Tall Oil Rosin | Percent Modified Turpentine Resin | Stormer Viscosity Poises 60° C | Photometer Sizing, Standard Feather Ink | | |
|---|---|---|---|---|---|---|
| | | | | 0.75% Added | 1.5% Added | 2.25% Added |
| 26 | 100 | 0 | 70 | 112 | 201 | 255 |
| 27 | 90 | 10 | 38 | 122 | 210 | 277 |
| 28 | 80 | 20 | 25 | 110 | 226 | 285 |
| 29 | 70 | 30 | 12 | 78 | 186 | 231 |

The present invention thus provides sizing compositions having lower viscosities and improved emulsifiability with equal or better sizing efficiencies than ordinary rosin size. Moreover, sizes of the invention containing fortified rosin and more than about 10% terpene polymer have better emulsifiability than similar sizes which do not contain the reaction product of a terpene resin and an $\alpha,\beta$-unsaturated carboxylic acid or derivative. The present invention is thus particularly advantageous as applied in the manufacture of fortified rosin sizes.

While preferred embodiments of the invention have been described, it will be appreciated that various modifications thereof can be made without departing from the scope of the invention. For example, the compositions of the invention may include a hydrocarbon resin which may be in addition to the terpene resin or as a partial replacement therefor. Hydrocarbon resins derived by the polymerization of various petroleum fractions are particularly suitable for this purpose. Moreover, the compositions of the invention can be used in conjunction with other conventional papermaking ingredients which are not incompatible therewith in the papermaking process.

What we claim and desire to protect by Letters Patent is:

1. A paste size comprising an aqueous dispersion of rosin, from about 0.5% to about 45% by weight, based on the weight of rosin, of a terpene hydrocarbon resin consisting of the polymerization products of terpene hydrocarbons and from about 0.5% to about 50% by weight, based on the weight of terpene hydrocarbon resin, of the reaction product of an acidic compound containing the

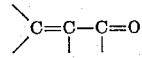

group with a terpene hydrocarbon resin consisting of the polymerization products of terpene hydrocarbons, said dispersion being partially neutralized with aqueous alkali.

2. A paste size in accordance with claim 1 wherein the rosin is a fortified rosin made up of rosin and the reaction product of rosin with an organic compound of acidic character containing a

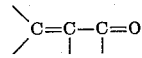

group.

3. A paste size in accordance with claim 1 in which the terpene hydrocarbon resin consisting of the polymerization products of terpene hydrocarbons is a polymerization product of sulfate turpentine.

4. A paste size in accordance with claim 1 in which the acidic compound is an $\alpha,\beta$-unsaturated polybasic carboxylic acid.

5. A paste size in accordance with claim 1 in which the acidic compound is an anhydride of an $\alpha,\beta$-unsaturated polybasic carboxylic acid.

6. The method of preparing a sizing composition for paper which comprises forming a mixture of rosin, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

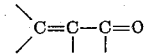

group with a terpene hydrocarbon resin consisting of the polymerization products of terpene hydrocarbons and then partially neutralizing the mixture with aqueous alkali.

7. The method in accordance with claim 6 wherein the rosin is a fortified rosin made up of rosin and the reaction product of rosin with an organic compound of acidic character containing a

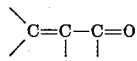

group.

8. A dry size composition comprising a mixture of rosin, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

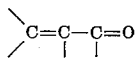

group with a terpene hydrocarbon resin consisting of the polymerization products of terpene hydrocarbons, said mixture being substantially completely neutralized with alkali.

9. A dry size composition comprising a mixture of the reaction product of an organic compound of acidic character containing a

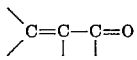

group with rosin in a ratio of one-twentieth to one mole of the former per mole of the latter, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

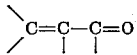

group with a terpene hydrocarbon resin consisting of the polymerization products of terpene hydrocarbons, said mixture being substantially completely neutralized with alkali.

10. The method of sizing paper which comprises forming an aqueous suspension of paper pulp, adding thereto a sufficient amount of an at least partially neutralized aqueous dispersion of rosin, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

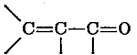

group with a terpene hydrocarbon resin consisting of the polymerization products of terpene hydrocarbons, to supply from about 0.25% to about 5% by weight, based on the weight of dry pulp, of solids, forming the pulp into sheets and drying the sheets.

11. The method of sizing paper which comprises forming an aqueous suspension of paper pulp, adding thereto a sufficient amount of an at least partially neutralized aqueous dispersion of rosin whch has been reacted with from about one-twentieth to one mole, per mole of rosin, of an organic compound of acidic character containing a

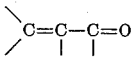

group, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

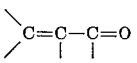

group with a terpene hydrocarbon resin consisting of the polymerization products of terpene hydrocarbons to supply from about 0.25% to about 5% by weight, based on the weight of dry pulp, of solids, forming the pulp into sheets and drying the sheets.

12. Paper sized with from about 0.25% to about 5% by weight, based on the weight of paper, of an at least partially neutralized mixture of rosin, from about 0.5% to about 45% by weight, based on the weight of rosin, of a terpene hydrocarbon resin consisting of the polymerization products of terpene hydrocarbons, and from about 0.5% to about 50% by weight, based on the weight of terpene hydrocarbon resin, of the reaction product of an acidic compound containing the

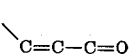

group with a terpene hydrocarbon resin consisting of the polymerization products of terpene hydrocarbons.

References Cited by the Examiner

UNITED STATES PATENTS

| | | | |
|---|---|---|---|
| 2,347,970 | 5/1944 | Rummelsburg | 260—93.3 |
| 2,503,407 | 4/1950 | Perry | 162—180 |
| 2,802,813 | 8/1957 | Maguire et al. | 260—93.3 |
| 2,994,635 | 8/1961 | Reaville et al. | 162—179 |

FOREIGN PATENTS 633,332   12/1949   Great Britain.

DONALL H. SYLVESTER, *Primary Examiner.*

S. L. BASHORE, *Assistant Examiner.*